US012482490B2

United States Patent
Arai

(10) Patent No.: US 12,482,490 B2
(45) Date of Patent: Nov. 25, 2025

(54) TAPE DRIVE DEVICE AND METHOD OF DETECTING STATE OF HEAD UNIT OF TAPE DRIVE DEVICE

(71) Applicant: NHK SPRING CO., LTD., Yokohama (JP)

(72) Inventor: Mikio Arai, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 47 days.

(21) Appl. No.: 18/640,961

(22) Filed: Apr. 19, 2024

(65) Prior Publication Data

US 2024/0386908 A1 Nov. 21, 2024

(30) Foreign Application Priority Data

May 15, 2023 (JP) .................................. 2023-080194

(51) Int. Cl.

| G11B 5/48 | (2006.01) |
|---|---|
| G11B 5/105 | (2006.01) |
| G11B 5/41 | (2006.01) |
| G11B 5/55 | (2006.01) |

(52) U.S. Cl.
CPC ............ *G11B 5/4873* (2013.01); *G11B 5/105* (2013.01); *G11B 5/41* (2013.01); *G11B 5/5504* (2013.01)

(58) Field of Classification Search
None
See application file for complete search history.

(56) References Cited

U.S. PATENT DOCUMENTS

| 4,392,163 A * | 7/1983 | Rijckaert ............... G11B 5/584 |
|---|---|---|
| 5,371,636 A * | 12/1994 | Nayak .................. G11B 5/5504 |
| 5,553,801 A * | 9/1996 | Lee ........................ G11B 15/60 |
| | | 242/615.4 |
| 7,375,911 B1 * | 5/2008 | Li .......................... G11B 5/483 |
| | | 360/78.12 |
| 10,854,236 B1 * | 12/2020 | Harper ................... G11B 15/60 |
| 10,957,362 B1 * | 3/2021 | Harper ..................... G11B 5/55 |
| 10,971,184 B1 | 4/2021 | Chew |
| 10,991,390 B2 | 4/2021 | Kobayashi |
| 11,056,139 B2 * | 7/2021 | Harper ............... G11B 5/00817 |
| 2008/0198506 A1 * | 8/2008 | Weng .................... G11B 5/5504 |
| | | 360/101 |
| 2012/0320472 A1 * | 12/2012 | Thompson ............. G11B 15/68 |
| 2013/0335858 A1 * | 12/2013 | Thompson ........... G11B 23/502 |
| | | 360/92.1 |
| 2022/0415358 A1 * | 12/2022 | Hanaoka ................ G11B 5/584 |
| 2023/0142229 A1 * | 5/2023 | Ishikawa ................ G11B 15/60 |
| | | 360/77.12 |

(Continued)

FOREIGN PATENT DOCUMENTS

JP 2020129424 A 8/2020

*Primary Examiner* — William J Klimowicz
(74) *Attorney, Agent, or Firm* — Holtz, Holtz & Volek PC

(57) ABSTRACT

A tape drive device includes a head member, a tape drive mechanism moving a tape, a suspension member supporting the head member, piezoelectric units, a drive voltage supply circuit applying a voltage to a piezoelectric element, and a controller. Each of the piezoelectric units includes a piezoelectric element. The controller determines a state of a head unit, based on a piezoelectric output generated at the piezoelectric element provided in the suspension member.

8 Claims, 13 Drawing Sheets

(56) References Cited

U.S. PATENT DOCUMENTS

| | | | |
|---|---|---|---|
| 2023/0154490 A1* | 5/2023 | Hanya | G11B 5/5552 |
| | | | 360/294.4 |
| 2024/0153534 A1* | 5/2024 | Hanya | G11B 5/4833 |
| 2024/0386907 A1* | 11/2024 | Kuwata | G11B 5/584 |
| 2024/0386914 A1* | 11/2024 | Nashimoto | G11B 15/1808 |

* cited by examiner

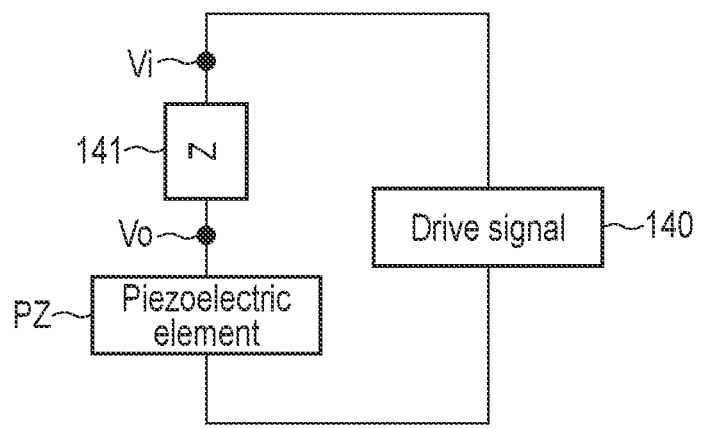
F I G. 11
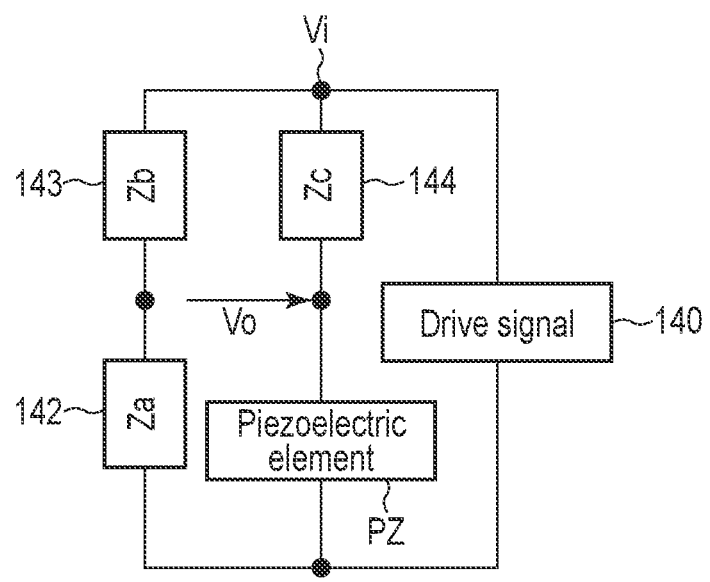
F I G. 12

TAPE DRIVE DEVICE AND METHOD OF DETECTING STATE OF HEAD UNIT OF TAPE DRIVE DEVICE

CROSS-REFERENCE TO RELATED APPLICATIONS

This application is based upon and claims the benefit of priority from prior Japanese Patent Application No. 2023-080194, filed May 15, 2023, the entire contents of which are incorporated herein by reference.

BACKGROUND OF THE INVENTION

1. Field of the Invention

Embodiments described herein relate generally to a tape drive device that uses a tape as a recording medium and a method of detecting a state of a head unit of the tape drive device.

2. Description of the Related Art

A tape drive device that uses a tape (magnetic tape) as a recording medium is known as an example of a data storage device. An example of the tape drive device is disclosed in U.S. Pat. No. 10,971,184 B (Patent Literature 1) and JP 2020-129424 A (Patent Literature 2). The tape drive device comprises a casing, a tape accommodated in the casing, a tape winding mechanism, a head assembly, and the like. Data is magnetically recorded on the tape. The head assembly includes a magnetic head, a head drive device, and the like. The head drive device moves the magnetic head relatively to the tape. The magnetic head includes elements for accessing data such as reading the data recorded on the tape or writing the data.

The head drive device of the tape drive device disclosed in Patent Literature 1 includes a head stack assembly and a voice coil motor. The voice coil motor moves the head stack assembly. Head arms with a spring function are provided at distal ends of the head stack assembly. Magnetic heads are mounted on the respective head arms. The magnetic heads are moved in a width direction of the tape by the voice coil motor.

A head drive device disclosed in Patent Literature 2 includes an actuator for coarse movement and an actuator for fine movement in order to accommodate a higher recording density of the tape. The actuator for coarse movement moves the magnetic head with a relatively large stroke. The actuator for fine movement moves the magnetic head with a relatively small stroke. A stepping motor or a voice coil motor (VCM) is used as the actuator for coarse movement. A piezoelectric body of lead zircon titanate (PZT) or the like may be used as the actuator for fine movement.

In the head drive device disclosed in Patent Literature 1, a small magnetic head is moved in a width direction of the tape by the voice coil motor. This conventional device may be damaged when the tape is brought into contact with the magnetic head. In addition, in the conventional device, it is not easy to stably hold the magnetic head at a predetermined position against the tape moving at a high speed. In the other conventional devices, using a large magnetic head with a length corresponding to the width of the tape has been considered. However, since such a large magnetic head has a heavy weight, it is difficult to stably support the magnetic head by a head arm with a suspension function.

The head drive device disclosed in Patent Literature 2 comprises an actuator for coarse movement composed of a voice coil motor, and an actuator for fine movement composed of a piezoelectric element. However, there is a problem that in this conventional device, the structure is complicated and the number of components is increased.

In a hard disk drive that uses a disk as a recording medium, air bearing is formed between a surface of the disk and a magnetic head. In contrast, the head drive device of Patent Literature 2 uses a tape as a recording medium. The head drive device of Patent Literature 2 is configured such that the tape does not come in contact with the magnetic head in order to prevent the tape from being damaged when fast forwarding and rewinding of the tape. In such a conventional device, however, the structure of the head drive device is further complicated.

The inventors of the present invention have considered supporting the head member by a suspension member comprising a piezoelectric element in order to avoid complicating the structure of the head drive device. The piezoelectric suspension drives the suspension member by deformation of the piezoelectric element when a voltage is applied to the piezoelectric element.

In the tape drive device, the tape is moved in a state of being in contact with the head member. For this reason, it cannot be avoided that adhesive dirt generated from the tape, dust entering the tape drive device, and the like adhere to the head member. The dirt adhering to the head member may cause errors when writing data to or reading data from the tape.

In order to normally maintain the function of the head member, it is important to check the state of the head member and detect any signs of abnormality at an early stage. However, the conventional tape drive device can only recognize the abnormality of the head member based on the data access errors by the head member. The conventional tape drive device has not been effective for recognizing the state of the head member.

An embodiment described herein aims to provide a tape drive device capable of detecting a state of a head unit and a method of detecting the state of the head unit.

BRIEF SUMMARY OF THE INVENTION

In general, according to one embodiment, there is provided a tape drive device using a tape as a recording medium. The tape drive device comprises a head member having a contact surface which is in contact with the tape, a tape drive mechanism, a base member, a suspension member, a piezoelectric unit, a drive voltage supply circuit, and a controller. The head member has a contact surface which is in contact with the tape. The piezoelectric unit is arranged in the suspension member. The tape drive mechanism moves the tape against the head member in the longitudinal direction of the tape. An example of the tape is a tape cartridge type in which a tape reel is contained inside a casing. Another example of the tape is a tape of a form other than the cartridge type, for example, a tape used for a tape embedded drive, or the like.

The suspension member is arranged between the base member and the head member to support the head member. The piezoelectric unit comprises a piezoelectric element. The piezoelectric element deforms the suspension member in a state in which a voltage is applied. The drive voltage supply circuit supplies a drive voltage to the piezoelectric element. The controller detects a piezoelectric output generated in the piezoelectric element in a state in which the suspension member is deformed.

According to the tape drive device of the present invention, the piezoelectric element can be used as a sensor and the state of the head unit can be detected, in the tape drive device comprising a suspension member supporting the head member, and a piezoelectric element arranged in the suspension member.

The controller may detect dirt adhering to the contact surface of the head member, based on the piezoelectric output.

The controller may detect elongation of the tape, based on the piezoelectric output.

An example of the tape drive device may include a head cleaning member for cleaning the contact surface of the head member. When the controller detects the dirt on the tape, the head cleaning member moves to the contact surface.

In the tape drive device, a first actuator assembly and a second actuator assembly may be arranged to be spaced apart from each other in a width direction of the tape. The piezoelectric element is arranged in each of the actuator assemblies. Then, the controller may detect a position in the tape width direction of dirt adhering to the contact surface of the head member, based on a piezoelectric output of a piezoelectric element arranged in the first actuator assembly and a piezoelectric output of a piezoelectric element arranged in the second actuator assembly.

In a method of detecting a state of a head member according to one embodiment, the head member is supported by a suspension member in which a piezoelectric element is arranged. The tape is moved against the head member in the longitudinal direction of the tape. A load in proportion to a magnitude of a frictional force generated on the contact surface between the tape and the head member is applied to the suspension member. A piezoelectric output is then generated in said piezoelectric element, and the state of the contact surface between said tape and said head member is determined based on the change in said piezoelectric output.

A first actuator assembly and a second actuator assembly may be arranged to be spaced apart from each other in a width direction of the tape. The position in the tape width direction of dirt adhering to the contact surface of the head member may be detected based on a piezoelectric voltage generated in a piezoelectric element arranged in the first actuator assembly and a piezoelectric voltage generated in a piezoelectric element arranged in the second actuator assembly.

A pair of piezoelectric elements may be arranged in the suspension member, a drive voltage may be applied to one of the piezoelectric elements, and a piezoelectric voltage obtained from the other piezoelectric element may be detected. A state of the contact surface of the head member may be determined based on a difference between the frequency response of the drive voltage and the frequency response of the piezoelectric voltage.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a block view schematically showing an example of an electrical circuit for a sensor function of the head driving device.

FIG. 12 is a block view schematically showing another example of the electrical circuit for the sensor function of the head driving device.

DETAILED DESCRIPTION OF THE INVENTION

[First Embodiment] FIG. 1 to FIG. 8

An example of a tape drive device according to a first embodiment will be described below with reference to FIG. 1 through FIG. 8. Incidentally, the tape drive device is not limited to the example shown in FIG. 1 and FIG. 2, but can be configured in various forms as needed.

Figure 1:
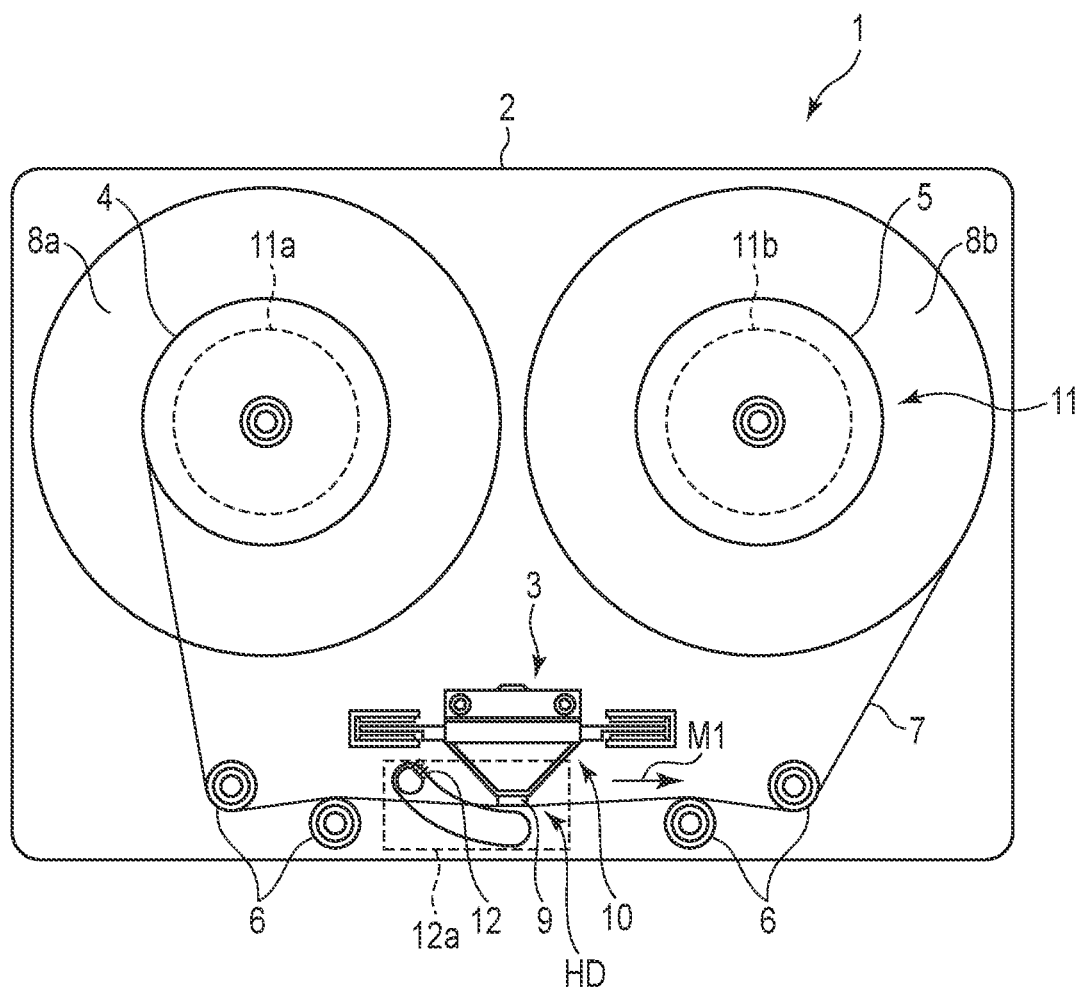
FIG. 1 is a front view schematically showing a tape drive device according to a first embodiment.

FIG. 1 is a front view schematically showing a tape drive device 1 comprising a head drive device 10. The tape drive device 1 includes a casing 2, a drive assembly 3, a first winding device 4, a second winding device 5, and a plurality of guide rollers 6. A tape 7 serving as a recording medium is wound round tape reels 8a and 8b.

A head member 9 serving as a magnetic head is provided in the drive assembly 3. The first winding device 4 and the second winding device 5 are rotated by a tape drive mechanism 11 comprising motors 11a and 11b. The tape drive mechanism 11 moves the tape 7 to the head member 9 in a longitudinal direction of the tape 7 (i.e., the direction indicated by arrow M1 in FIG. 1).

The drive assembly 3 comprises a function to move the head member 9 in a direction along a surface of the tape 7, particularly in a width direction of the tape 7. The head member 9 extends in the width direction of the tape 7. The head member 9 is provided with, for example, elements which can convert magnetic signals and electrical signals, such as MR elements. Accessing data on the tape 7 such as writing or reading the data is performed by these elements. The head member 9 is often referred to as a head bar or a slider.

The head drive device 10 comprises a head cleaning member 12 for cleaning the surface of the head member 9, which is brought into contact with the tape 7. The head cleaning member 12 is moved between a standby position shown in FIG. 1 and a cleaning position shown in FIG. 2 by the cleaning movement mechanism 12a. When the tape 7 is used (loaded) as shown in FIG. 1, the head cleaning member 12 is moved to the standby position remote from the head member 9. Interference between the tape 7 and the head cleaning member 12 is thereby avoided.

Figure 2:
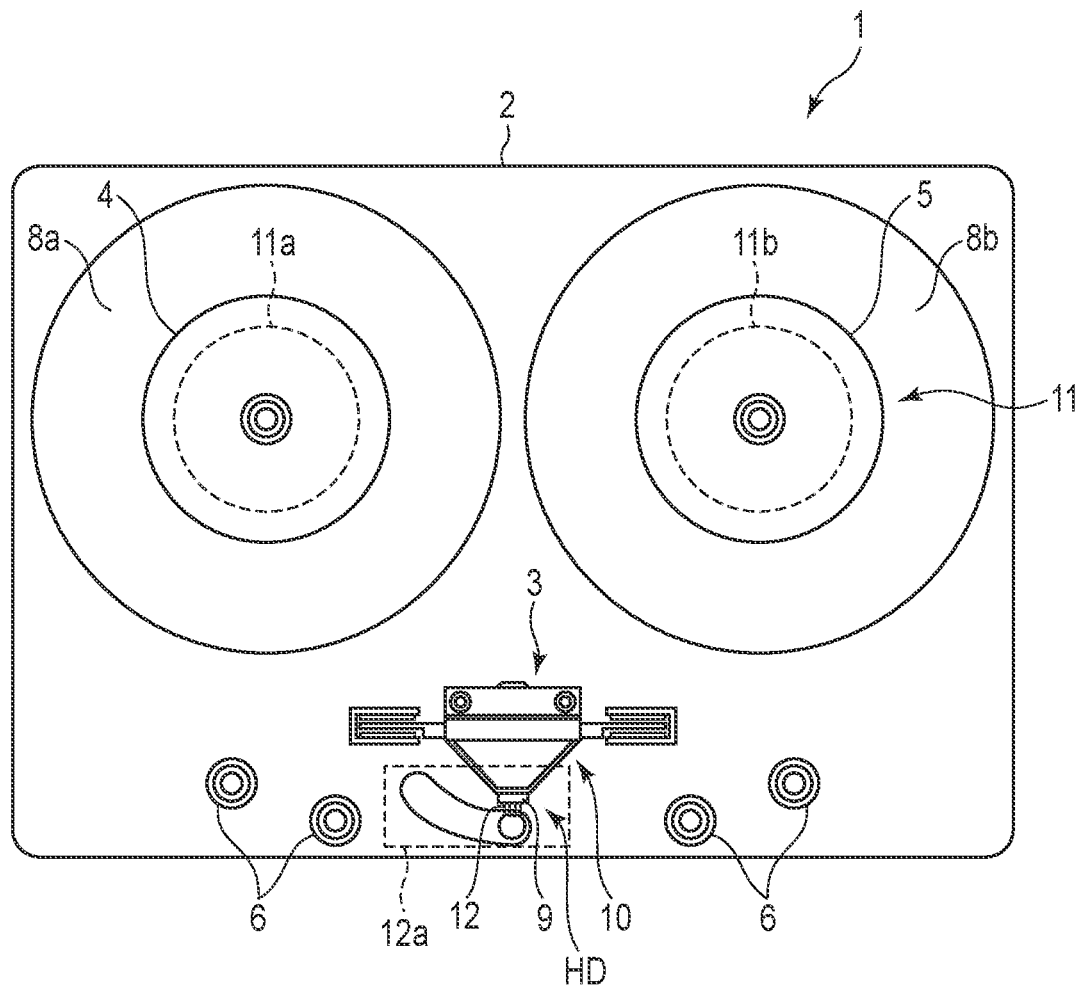
FIG. 2 is a front view showing a state in which a head cleaning member of the tape drive device shown in FIG. 1 is moved.

As shown in FIG. 2, when the tape 7 is not set (unloaded), the head cleaning member 12 is moved to the position of the head member 9. When the head cleaning member 12 is brought into contact with the head member 9, dirt adhering to the head member 9 can be removed.

Figure 3:
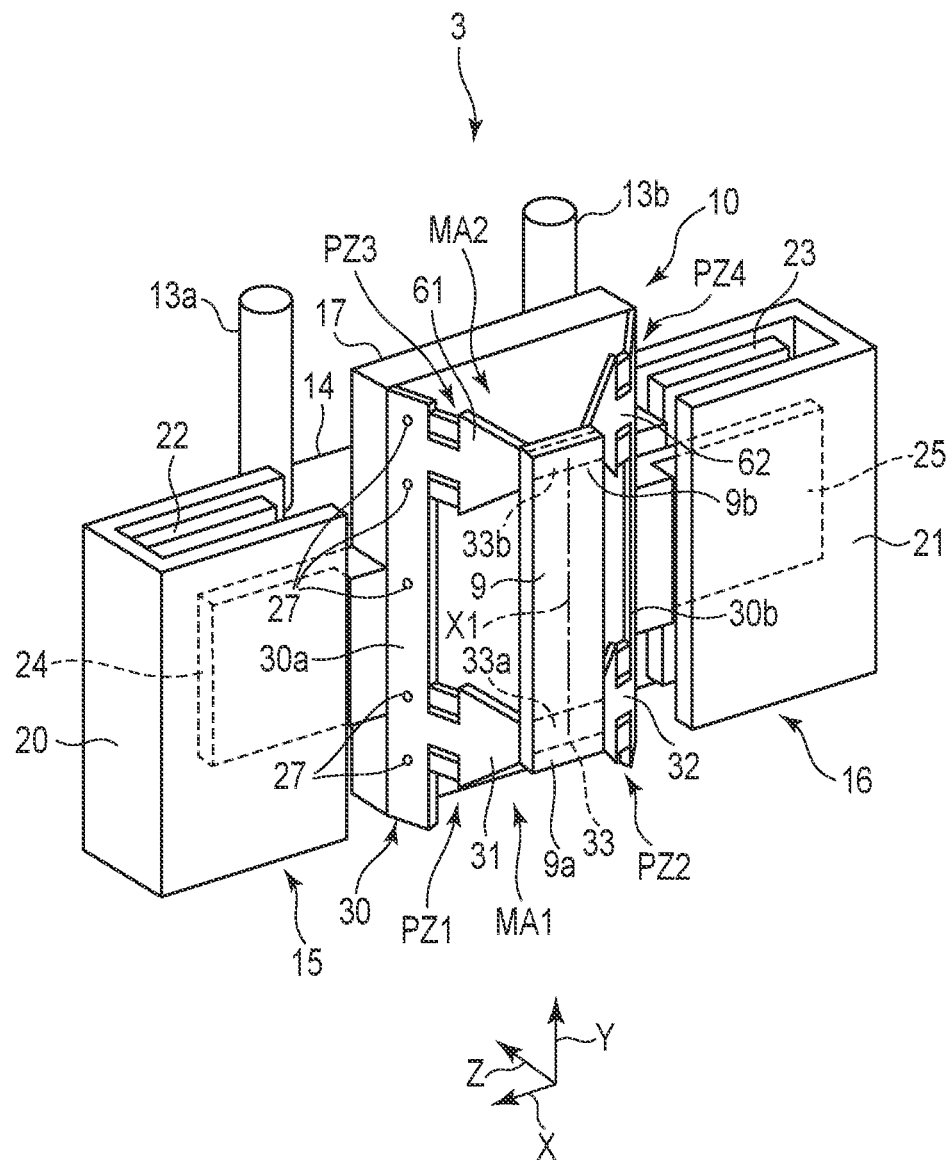
FIG. 3 is a perspective view showing a drive assembly of the tape drive device shown in FIG. 1.

FIG. 3 shows an example of the drive assembly 3. The drive assembly 3 includes a pair of guide members 13a and 13b, a slide member 14, voice coil motors 15 and 16, a base member 17, and a head drive device 10. The slide member 14 is moved along the guide members 13a and 13b. The voice coil motors 15 and 16 move the slide member 14. The base member 17 is provided on the slide member 14.

The head drive device 10 is arranged on the slide member 14. In the present specification, the width direction of the head member 9 is referred to as an X-axis direction (shown in FIG. 3 and FIG. 6), for convenience of description. The longitudinal direction of the head member 9 is referred to as a Y-axis direction and a thickness direction of the head member 9 is referred to as a Z-axis direction. The Y-axis direction is also the direction along the surface of the tape 7 (also referred to as a tape track direction).

As shown in FIG. 3, the voice coil motors 15 and 16 include yokes 20 and 21, magnets 22 and 23, and coils 24 and 25, respectively. The voice coil motors 15 and 16 are voice coil motors for coarse movement. The voice coil motors 15 and 16 move the slide member 14 and the base member 17 along the guide members 13a and 13b. The head drive device 10 is a head drive device for fine movement. The head drive device 10 moves the head member 9 at a minute amount.

Figure 4:
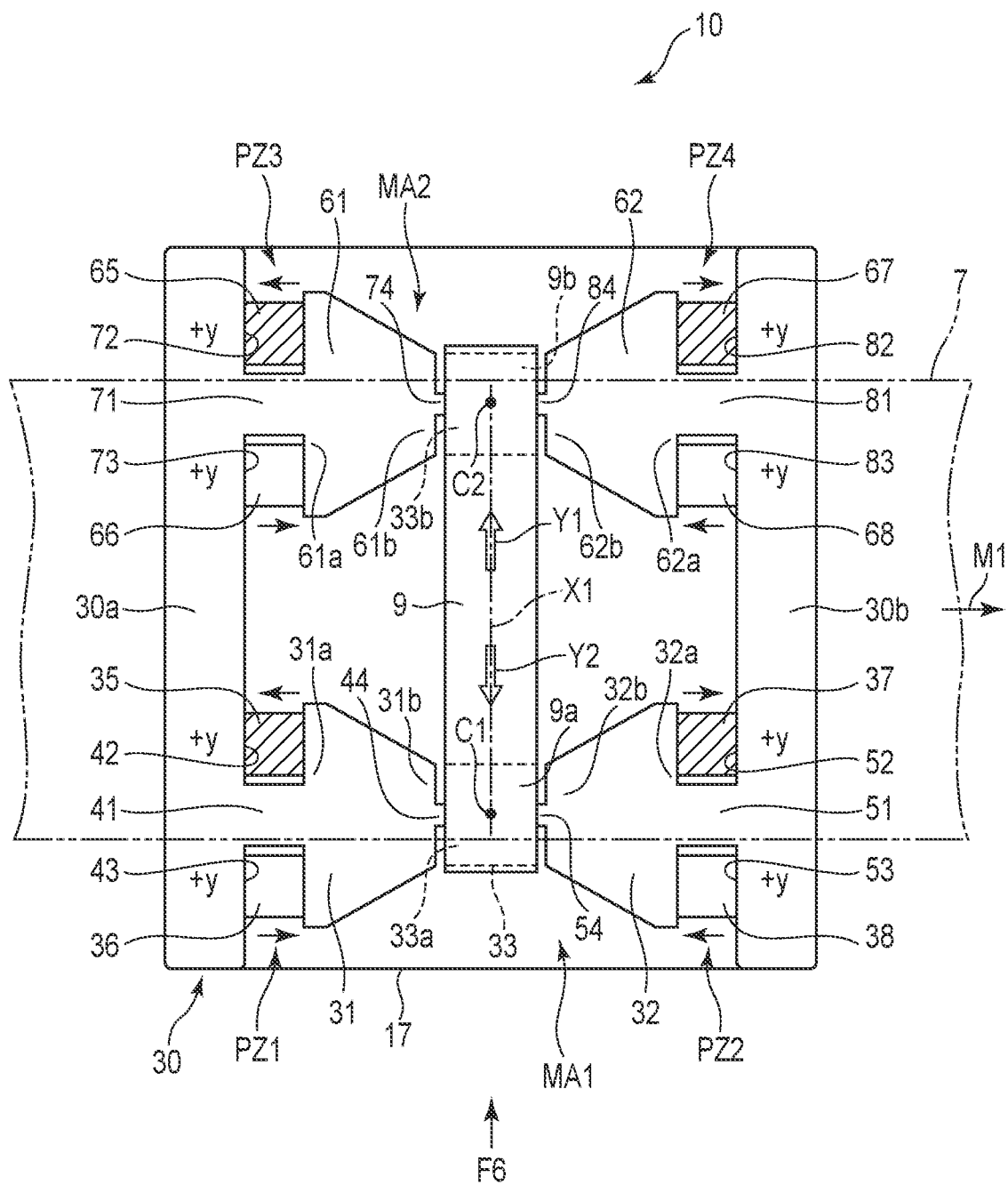
FIG. 4 is a plan view showing the head drive device of the drive assembly shown in FIG. 3.

FIG. 4 is a plan view showing the head drive device 10. The head drive device 10 comprises a frame structure 30, a first actuator assembly MA1 located on the lower side in FIG. 4, and a second actuator assembly MA2 located on the upper side in FIG. 4. The frame structure 30 is a part of the base member 17. A configuration of the first actuator assembly MA1 and a configuration of the second actuator assembly MA2 are substantially common to each other.

The frame structure 30 includes a first frame portion 30a and a second frame portion 30b. The first frame portion 30a and the second frame portion 30b extend in directions approximately parallel to each other. The first frame portion 30a is fixed to a first side portion of the base member 17 by means of a fixing portion 27 (shown in FIG. 3) such as a screw member or adhesive. The second frame portion 30b is also fixed to a second side portion of the base member 17 by means of a similar fixing portion.

First, the first actuator assembly MA1 will be described.

The first actuator assembly MA1 includes a first suspension member 31, a second suspension member 32, a first portion 33a of a head support portion 33, and four piezoelectric elements 35, 36, 37, and 38. The piezoelectric elements 35, 36, 37, and 38 are composed of piezoelectric bodies which are deformed when a voltage is applied, for example, PZT.

As shown in FIG. 4, the head member 9 includes a first end portion 9a in the longitudinal direction and a second end portion 9b in the longitudinal direction. An axis X1 of the head member 9 extends through a center C1 of the first portion 33a of the head support portion 33 in the longitudinal direction of the head member 9. The first suspension member 31 and the second suspension member 32 have shapes substantially symmetrical with each other with the axis X1 used as an axis of symmetry.

The first suspension member 31 and the second suspension member 32 each extend in a direction perpendicular to the axis X1. The first portion 33a of the head support portion 33 supports the first end portion 9a of the head member 9. The first end portion 9a of the head member 9 is fixed to the first portion 33a of the head support portion 33 by means of fixing means such as an adhesive.

The first suspension member 31 extends from the first frame portion 30a toward the first portion 33a of the head support portion 33. The second suspension member 32 is provided on a side opposite to the first suspension member 31 across the first portion 33a of the head support portion 33. The second suspension member 32 extends from the second frame portion 30b toward the first portion 33a of the head support portion 33. The first suspension member 31 and the second suspension member 32 are composed of, for example, stainless steel plates.

As shown in FIG. 4, the first suspension member 31 is tapered in width from a first proximal portion 31a to a distal portion 31b. A first base side hinge portion 41 is formed between the first proximal portion 31a and the first frame portion 30a. A pair of element housing portions 42 and 43 composed of recesses are formed on both sides of the first base side hinge portion 41. A first head side hinge portion 44 with a narrower width is provided between the distal portion 31b of the first suspension member 31 and the first portion 33a of the head support portion 33.

The piezoelectric elements 35 and 36 are housed in the element housing portions 42 and 43, respectively. In FIG. 4, the hatched piezoelectric element 35 is housed in the element housing portion 42. The piezoelectric element 35 is housed in the element housing portion 42 with a predetermined polarity so as to expand or contract in accordance with the polarity (positive or negative) of the applied voltage. The piezoelectric element 36 is housed in the element housing portion 43. The piezoelectric element 36 is housed in the element housing portion 43 with its orientation reversed such that its polarity is opposite to that of the piezoelectric element 35.

The piezoelectric elements 35 and 36 constitute a first piezoelectric unit PZ1. When the piezoelectric element 35 contracts and the piezoelectric element 36 extends by application of a voltage, the distal portion 31b of the first suspension member 31 is displaced in a first direction (indicated by arrow Y1 in FIG. 4). When the piezoelectric element 35 extends and the piezoelectric element 36 contracts, the distal portion 31b of the first suspension member 31 is displaced in a second direction (indicated by arrow Y2 in FIG. 4). The first suspension member 31 and the piezoelectric elements 35 and 36 constitute the first piezoelectric suspension.

The second suspension member 32 is tapered in width from a second proximal portion 32a to a distal portion 32b. A second base side hinge portion 51 is formed between the second proximal portion 32a and the second frame portion 30b. A pair of element housing portions 52 and 53 composed of recesses are formed on both sides of the second base side hinge portion 51. A second head side hinge portion 54 with a narrower width is provided between the distal portion 32b of the second suspension member 32 and the first portion 33a of the head support portion 33.

The piezoelectric elements 37 and 38 are housed in the element housing portions 52 and 53, respectively. In FIG. 4, the hatched piezoelectric element 37 is housed in the element housing portion 52. The piezoelectric element 37 is housed in the element housing portion 52 with a predetermined polarity so as to expand or contract in accordance with the polarity of the applied voltage. The piezoelectric element 38 is housed in the element housing portion 53. The piezoelectric element 38 is housed in the element housing portion 53 with its orientation reversed such that its polarity is opposite to that of the piezoelectric element 37. The piezoelectric elements 37 and 38 constitute a second piezoelectric unit PZ2.

Figure 5:
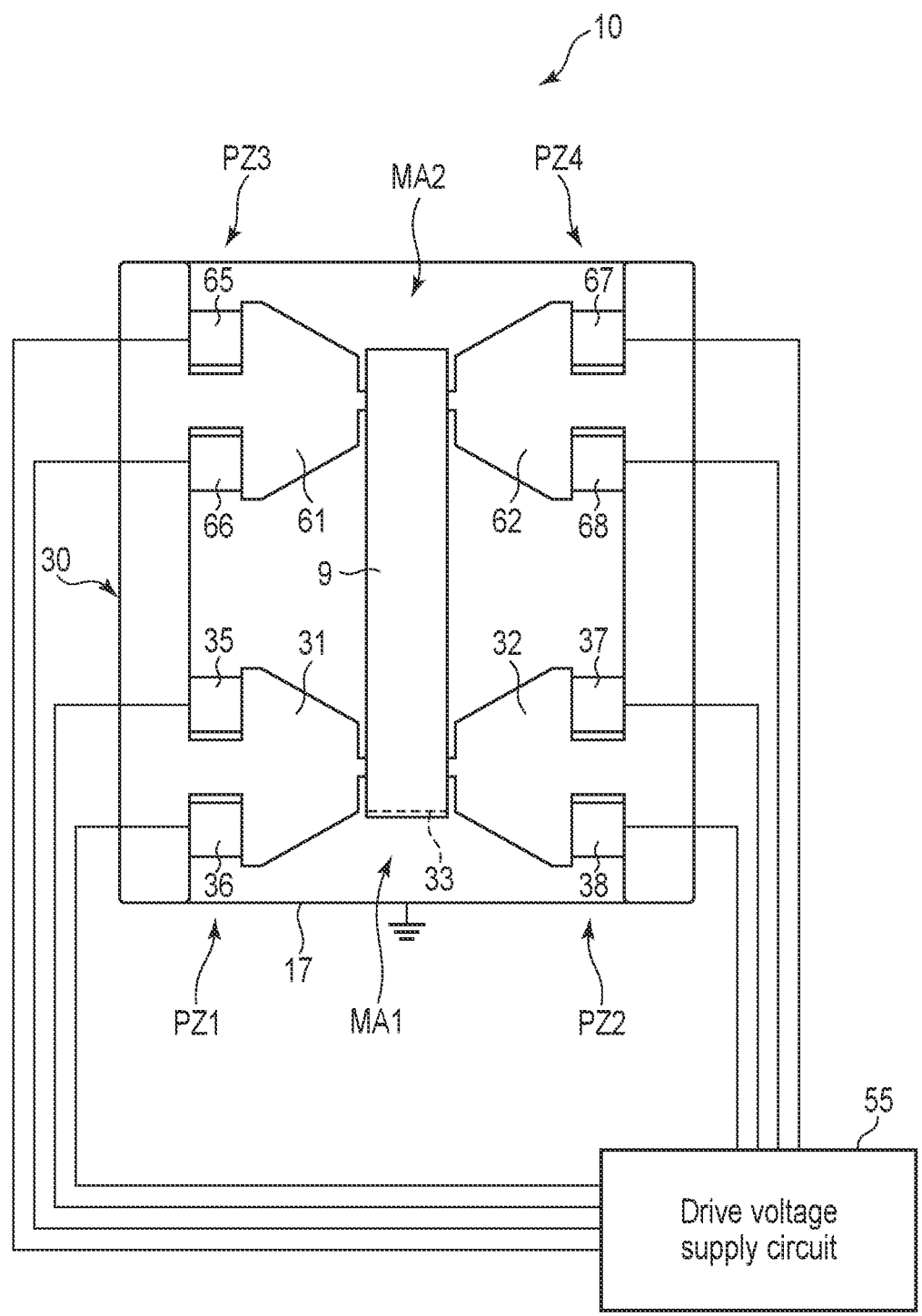
FIG. 5 is a diagram showing a drive voltage supply circuit of the head drive device shown in FIG. 4.

A drive voltage supply circuit 55 is schematically shown in FIG. 5. The piezoelectric elements 35 and 36 of the first piezoelectric suspension and the piezoelectric elements 37 and 38 of the second piezoelectric suspension are connected to the drive voltage supply circuit 55. The drive voltage supply circuit 55 supplies voltages to drive the piezoelectric elements 35, 36, 37, and 38, to the piezoelectric elements 35, 36, 37, and 38.

When the piezoelectric element 37 contracts and the piezoelectric element 38 extends by application of a voltage, the distal portion 32b of the second suspension member 32 is displaced in the first direction (indicated by arrow Y1 in FIG. 4). When the piezoelectric element 37 extends and the piezoelectric element 38 contracts, the distal portion 32b of the second suspension member 32 is displaced in a second direction (indicated by arrow Y2 in FIG. 4). When the second suspension member 32 is displaced in the same direction as the first suspension member 31, the head member 9 is thereby moved in the tape track direction (first direction Y1 or second direction Y2). The second suspension member 32 and the piezoelectric elements 37 and 38 constitute the second piezoelectric suspension.

Figure 6:
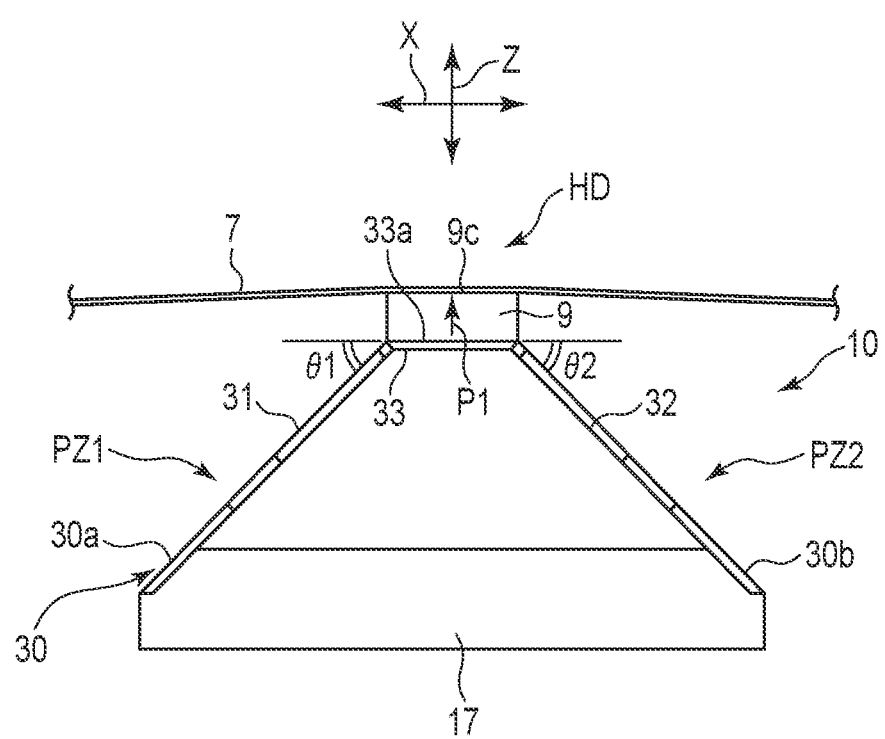
FIG. 6 is a front view showing the head drive device shown in FIG. 4, viewed from a direction indicated by arrow F6 in FIG. 4.

FIG. 6 is a front view showing the head drive device 10 as viewed from a direction indicated by arrow F6 in FIG. 4. The first suspension member 31 is bent at an angle θ1 (for example, 45 degrees) smaller than 90 degrees with respect to the first portion 33a of the head support portion 33. The second suspension member 32 is also bent at an angle θ2 (for example, 45 degrees) smaller than 90 degrees with respect to the first portion 33a of the head support portion 33.

The head member 9 has a contact surface 9c that is in contact with the tape 7. The head member 9 makes access to the tape 7, such as magnetically writing and reading data, through the contact surface 9c. If dirt adheres to the contact surface 9c, magnetic access may be hindered. In the present specification, a part around the head member including the contact surface 9c where the tape 7 and the head member 9 are in contact with each other is referred to as a head unit HD.

Next, the second actuator assembly MA2 will be described.

The second actuator assembly MA2 includes a third suspension member 61 located on the left side in FIG. 4, a fourth suspension member 62 located on the right side in FIG. 4, a second portion 33b of the head support portion 33, and four piezoelectric elements 65, 66, 67, and 68. The piezoelectric elements 65, 66, 67, and 68 are composed of piezoelectric bodies which are deformed when a voltage is applied, for example, PZT.

As shown in FIG. 4, the third suspension member 61 and the fourth suspension member 62 have shapes substantially symmetrical with each other. The second portion 33b of the head support portion 33 supports the second end portion 9b of the head member 9. The second end portion 9b of the head member 9 is fixed to the second portion 33b of the head support portion 33 by means of fixing means such as an adhesive.

The third suspension member 61 extends from the first frame portion 30a toward the second portion 33b of the head support portion 33. The fourth suspension member 62 is provided on a side opposite to the third suspension member 61 across the second portion 33b of the head support portion 33. The fourth suspension member 62 extends from the second frame portion 30b toward the second portion 33b of the head support portion 33. The third suspension member 61 and the fourth suspension member 62 are composed of, for example, stainless steel plates. An axis X1 of the head member 9 passes through a center C2 (shown in FIG. 4) of the second portion 33b of the head support portion 33.

As shown in FIG. 4, the third suspension member 61 is tapered in width from a third proximal portion 61a to a distal portion 61b. A third base side hinge portion 71 is formed between the third proximal portion 61a and the first frame portion 30a. A pair of element housing portions 72 and 73 composed of recesses are formed on both sides of the third base side hinge portion 71. A third head side hinge portion 74 with a narrower width is provided between the distal portion 61b of the third suspension member 61 and the second portion 33b of the head support portion 33.

The piezoelectric elements 65 and 66 are housed in the element housing portions 72 and 73, respectively. In FIG. 4, the hatched piezoelectric element 65 is housed in the element housing portion 72. The piezoelectric element 65 is housed in the element housing portion 72 with a predetermined polarity so as to expand or contract in accordance with the polarity of the applied voltage. The piezoelectric element 66 is housed in the element housing portion 73. The piezoelectric element 66 is housed in the element housing portion 73 with its orientation reversed such that its polarity is opposite to that of the piezoelectric element 65.

The piezoelectric elements 65 and 66 constitute a third piezoelectric unit PZ3. When the piezoelectric element 65 contracts and the piezoelectric element 66 extends by application of a voltage, the distal portion 61b of the third suspension member 61 is displaced in a first direction (indicated by arrow Y1 in FIG. 4). When the piezoelectric element 65 extends and the piezoelectric element 66 contracts, the distal portion 61b of the third suspension member 61 is displaced in a second direction (indicated by arrow Y2 in FIG. 4). The third suspension member 61 and the piezoelectric elements 65 and 66 constitute the third piezoelectric suspension.

The fourth suspension member 62 is tapered in width from a fourth proximal portion 62a to a distal portion 62b. A fourth base side hinge portion 81 is formed between the fourth proximal portion 62a and the second frame portion 30b. A pair of element housing portions 82 and 83 composed of recesses are formed on both sides of the fourth base side hinge portion 81. A fourth head side hinge portion 84 with a narrower width is provided between the distal portion 62b of the fourth suspension member 62 and the second portion 33b of the head support portion 33.

Piezoelectric elements 67 and 68 are housed in the element housing portions 82 and 83, respectively. In FIG. 4, the hatched piezoelectric element 67 is housed in the element housing portion 82. The piezoelectric element 67 is housed in the element housing portion 82 with a predetermined polarity so as to expand or contract in accordance with the polarity of the applied voltage. The other piezoelectric element 68 is housed in the element housing portion 83. The piezoelectric element 68 is housed in the element housing portion 83 with its orientation reversed such that its polarity is opposite to that of the piezoelectric element 67. The piezoelectric elements 67 and 68 constitute a fourth piezoelectric unit PZ4. The fourth suspension member 62 and the piezoelectric elements 67 and 68 constitute the fourth piezoelectric suspension.

As shown in FIG. 5, the piezoelectric elements 65 and 66 of the third piezoelectric suspension and the piezoelectric elements 67 and 68 of the fourth piezoelectric suspension are connected to the drive voltage supply circuit 55. The drive voltage supply circuit 55 supplies voltages to drive the piezoelectric elements 65, 66, 67, and 68, to the piezoelectric elements 65, 66, 67, and 68.

When the piezoelectric element 67 contracts and the other piezoelectric element 68 extends by application of a voltage, the distal portion 62b of the fourth suspension member 62 is displaced in the first direction (indicated by arrow Y1 in FIG. 4). When the piezoelectric element 67 extends and the piezoelectric element 68 contracts, the distal portion 62b of the fourth suspension member 62 is displaced in a second direction (indicated by arrow Y2 in FIG. 4).

When the fourth suspension member 62 is thus displaced in the same direction as the third suspension member 61, the second portion 33b of the head support portion 33 is thereby moved in the direction (first direction Y1 or second direction Y2) along the surface of the tape 7. Each of the first direction Y1 and the second direction Y2 is the tape track direction.

For example, when an input voltage [+y] is applied to all the piezoelectric elements 35 to 38 and 65 to 68, the piezoelectric elements 36, 38, 66, and 68 in the positive position extend and the piezoelectric elements 35, 37, 65, 67 in the reversed arrangement contract. The head member 9 is thereby moved in the first direction (indicated by arrow Y1).

When an input voltage [−y] is applied to all the piezoelectric elements 35 to 38 and 65 to 68, the piezoelectric elements 36, 38, 66, and 68 in the positive position contract and the piezoelectric elements 35, 37, 65, 67 in the reversed arrangement extend. The head member 9 is thereby moved in the second direction (opposite to arrow Y1). Thus, the head member 9 can be moved in the Y-axis direction by a single system input signal [±y].

The third suspension member 61 is bent at an angle θ1 (for example, 45 degrees) with respect to the head support portion 33, similarly to the first suspension member 31 shown in FIG. 6. The fourth suspension member 62 is also bent at an angle θ2 (for example, 45 degrees) with respect to the head support portion 33, similarly to the second suspension member 32 shown in FIG. 6.

Sensor Function of the Head Drive Device 10

The sensor function of the head drive device 10 will be described below with reference to FIG. 7 and FIG. 8.

Figure 7:
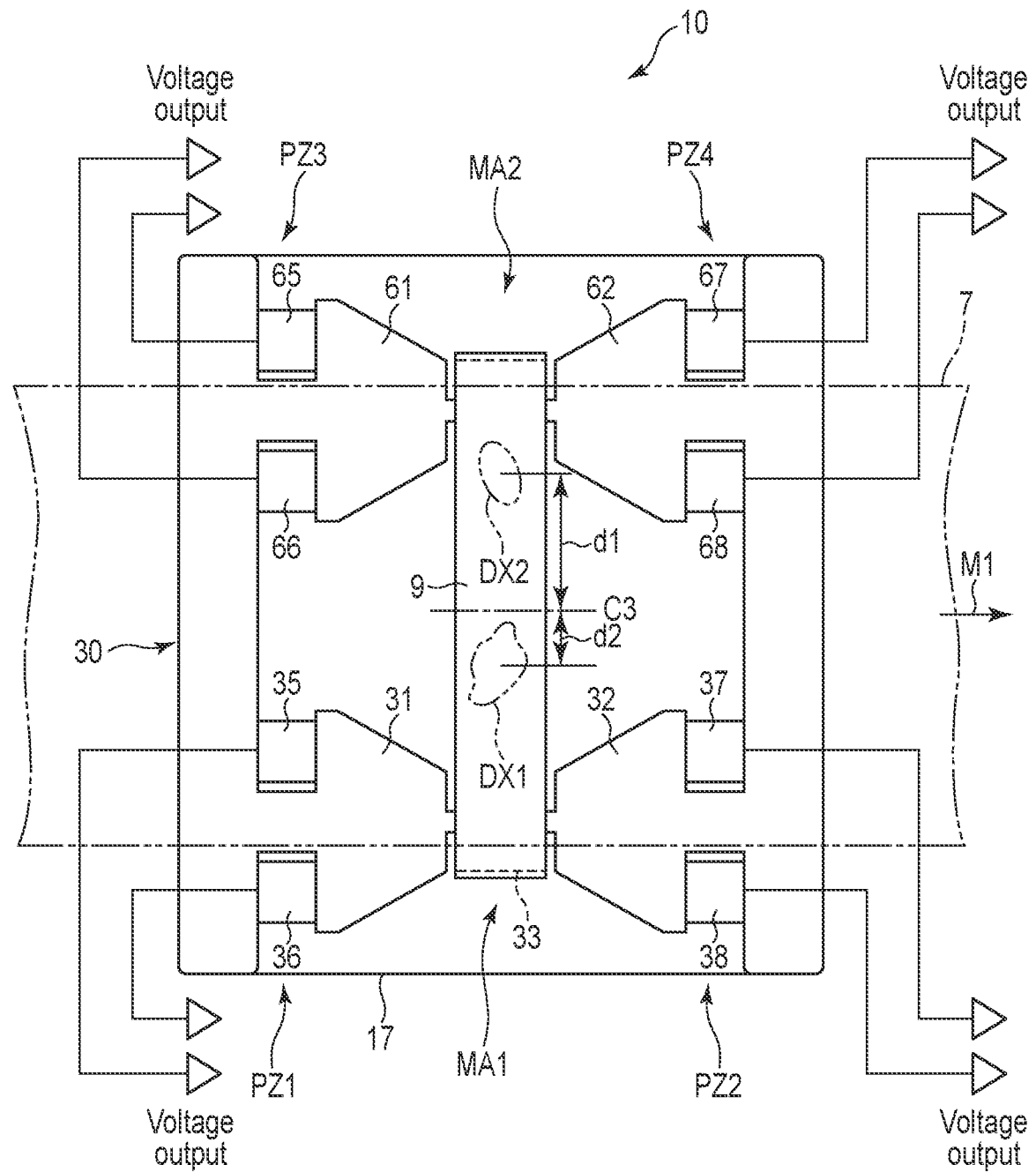
FIG. 7 is a schematic view showing an electrical circuit for a sensor function of the head driving device shown in FIG. 4.

FIG. 7 is a schematic diagram showing an electrical circuit for the sensor function of the head drive device 10. FIG. 8 is a block diagram showing an example of a specific configuration of a controller 90A.

As shown in FIG. 7, dirt DX1 and DX2 may adhere to the head member 9. If the dirt is adhesive or has properties that increase frictional resistance with the tape 7, the dirt may affect the function of the head member 9. Therefore, the head drive device 10 of the present embodiment detects the dirt on the head member 9 using the piezoelectric effect of the piezoelectric units PZ1, PZ2, PZ3, and PZ4.

As shown in FIG. 7, the center of the head member 9 in the longitudinal direction is referred to as C3. It is assumed here that distance d1 is different from distance d2. The distance d1 is a distance from the center C3 of the head member 9 to a center of the dirt DX1. The distance d2 is a distance from the center C3 of the head member 9 to a center of the other dirt DX2. The conditions are the same if there is one dirt and the dirt is located at a position remote from the center C3 of the head member 9.

When the tape 7 is moved against the head member 9 at a constant speed in the direction indicated by the arrow M1 in FIG. 7, a frictional force is generated at the contact area (contact surface 9c) between the tape 7 and the head member 9. A load different from a usual load is applied to the head member 9 by this frictional force. This load deforms the suspension members 31, 32, 61, and 62 and is input to the piezoelectric units PZ1, PZ2, PZ3, and PZ4. For this reason, stress is generated in each piezoelectric element of the piezoelectric units PZ1, PZ2, PZ3, and PZ4, resulting in piezoelectric output (voltage output shown in FIG. 7) due to the piezoelectric effect.

If the head member 9 is clean, the effect of frictional force is small enough to be negligible, and the influence of the frictional force can be compensated for by the control system. The dirt adhering to the head member 9 may be adhesive or may have a nature to increase the frictional resistance with the tape 7. In this case, the frictional resistance increases as compared to a case where the head member 9 is clean. If the dirt exists at a position remote from the center C3 of the head member 9, the frictional force input to the first actuator assembly MA1 is different from the frictional force input to the second actuator assembly MA2.

In addition, a part of the tape 7 in the width direction may be stretched due to age-related deterioration or the like. If the tape 7 is partially stretched in the width direction, the contact pressure P1 (shown in FIG. 6) of the head member 9 against the tape 7 is reduced. If the elongation of the tape 7 is remote from the center C3 of the head member 9, the frictional force input to the first actuator assembly MA1 is different from the frictional force input to the second actuator assembly MA2.

Figure 8:
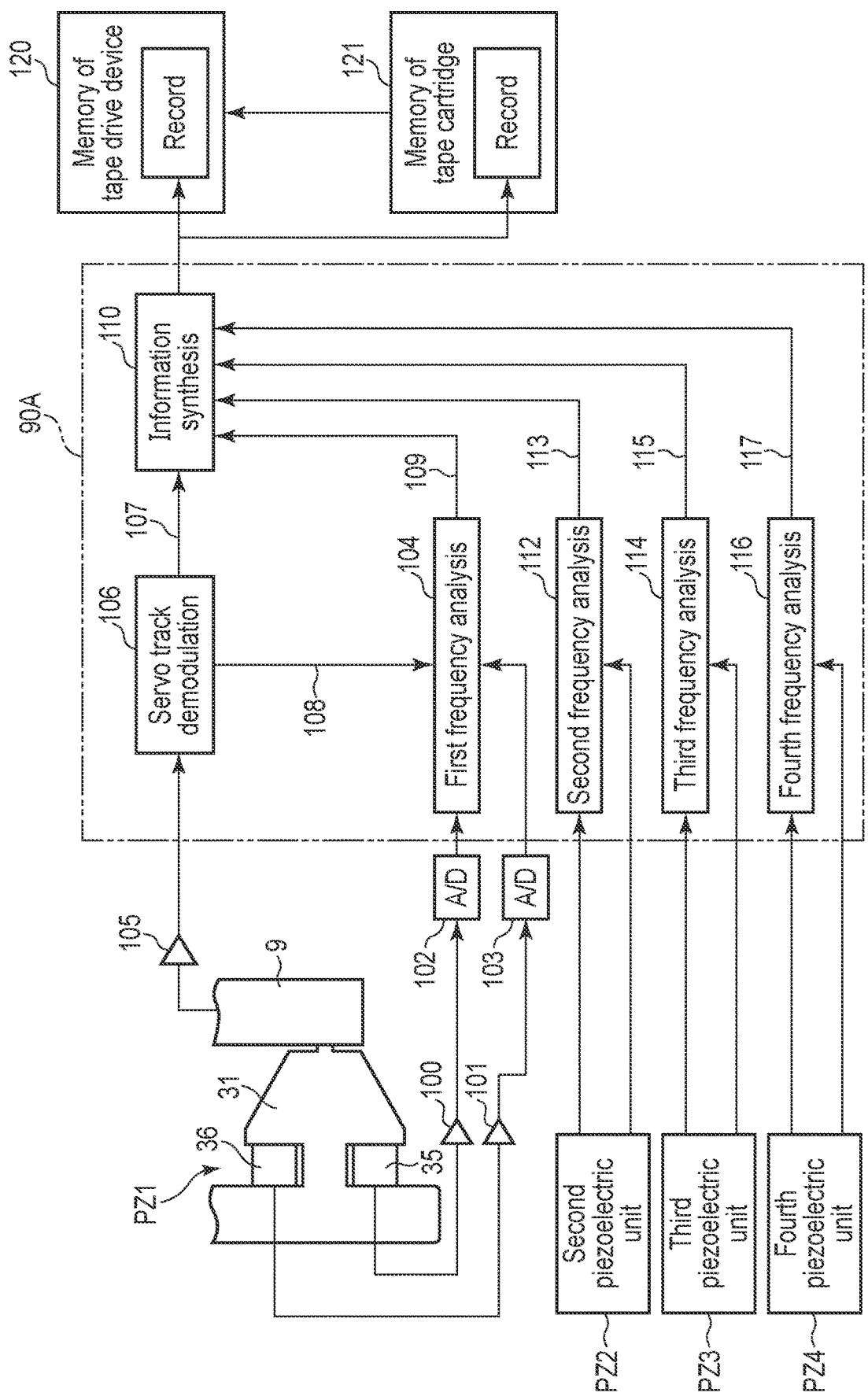
FIG. 8 is a block diagram showing a controller of the electrical circuit shown in FIG. 7.

Therefore, in the embodiment, the voltage output from the piezoelectric elements is processed by the controller 90A shown in FIG. 8. The dirt on the head member 9 and the partial elongation of the tape 7 are detected, and the position of the dirt (i.e., the position of the tape width direction) is also detected by this process. The processing of the piezoelectric output of the first piezoelectric unit PZ1 shown in FIG. 8 will be described as typical processing.

As shown in FIG. 8, the voltage output of the first piezoelectric unit PZ1 is amplified by piezoelectric amplifiers 100 and 101 and is input to a first frequency analysis circuit 104 via analog-to-digital converters 102 and 103. The signal from the head member 9 is input to a servo track demodulation circuit 106 via a head amplifier 105. Position information 107, and speed information 108 of the tape 7 are obtained based on a servo track obtained by the signal from the head member 9.

The first frequency analysis circuit 104 calculates the friction resistance between the tape 7 and the head member 9 from the speed of the tape 7 and the voltage output, and inputs an obtained first sensor output 109 to an information synthesis circuit 110. A piezoelectric output of the second piezoelectric unit PZ2 is input to a second frequency analysis circuit 112. A second sensor output 113 obtained by the second frequency analysis circuit 112 is input to the information synthesis circuit 110.

A piezoelectric output of the third piezoelectric unit PZ3 is input to a third frequency analysis circuit 114. The second sensor output 113 obtained by the third frequency analysis circuit 114 is input to the information synthesis circuit 110. A third sensor output 115 obtained by the third frequency analysis circuit 114 is input to the information synthesis circuit 110. A piezoelectric output of the fourth piezoelectric unit PZ4 is input to a fourth frequency analysis circuit 116. A fourth sensor output 117 obtained by the fourth frequency analysis circuit 116 is input to the information synthesis circuit 110.

The information synthesis circuit 110 generates an information map with functions obtained by the sensor outputs 109, 113, 115, and 117 from four locations and with servo track position information. The information map includes information on the dirt on the head member or the elongation of the tape caused by the deterioration. Moreover, this information map associates the position information on the tape with the information on the frictional resistance with the head member. For example, the piezoelectric element near the dirt is different from the piezoelectric element far from the dirt in the amount of variation in voltage output. The position of the dirt (i.e., the position in the tape width direction) can be detected based on the difference in the amount of variation.

The information map obtained by the information synthesis circuit 110 is recorded in a memory (drive cache) 120 of the tape drive device 1. For example, a tape status map corresponding to a tape cartridge set in the tape drive device 1 is recorded in the memory 120. This information map is also recorded in a memory 121 of the tape cartridge. Thus, the loss of inspection results can be prevented even if a tape cartridge is replaced at any timing. The tape cartridge in which information is recorded is set again in the tape drive device 1. Then, the information map of the recorded position is read from the memory (drive cache) 120 of the tape drive device 1. The tape cartridge includes a casing and a tape reel contained inside the casing. The present invention can also be applied to tapes other than the cartridge type, such as tapes used in tape embedded drives.

When dirt exceeding an allowable value is detected, the head member 9 may be cleaned by, for example, the head cleaning member 12 shown in FIG. 2. Alternatively, an operator may be notified by an alarm lamp or buzzer that the head member has dirt. When the dirt on the head member 9 consists of peelable particles, the piezoelectric element may be vibrated by the drive voltage supply circuit 55 (shown in FIG. 5). The dirt on the head member 9 may be able to be removed by vibrating the piezoelectric element at a high frequency (for example, in the ultrasonic range).

Figure 9:
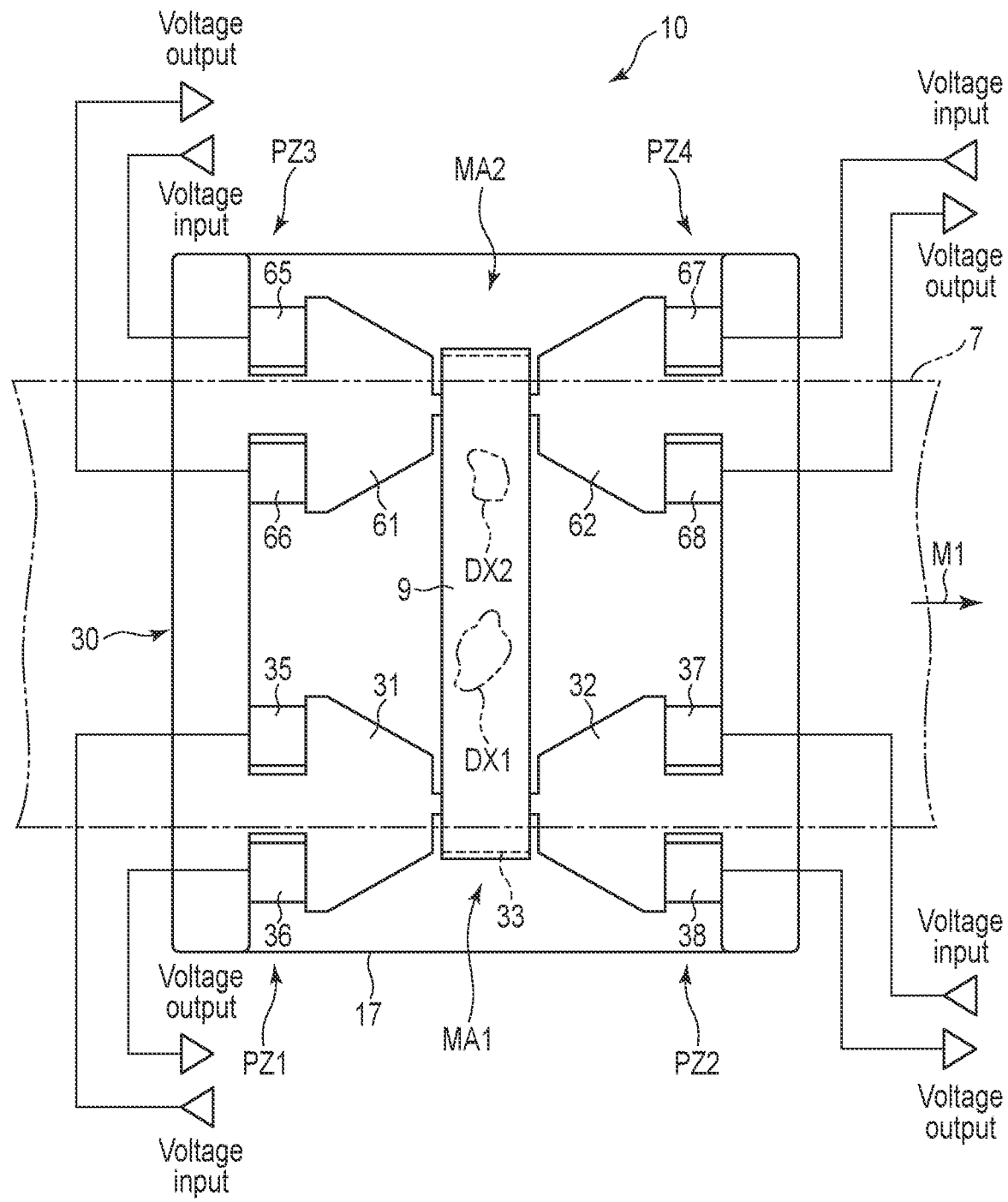
FIG. 9 is a view schematically showing an electrical circuit for a sensor function of a head drive device according to a second embodiment.
Figure 10:
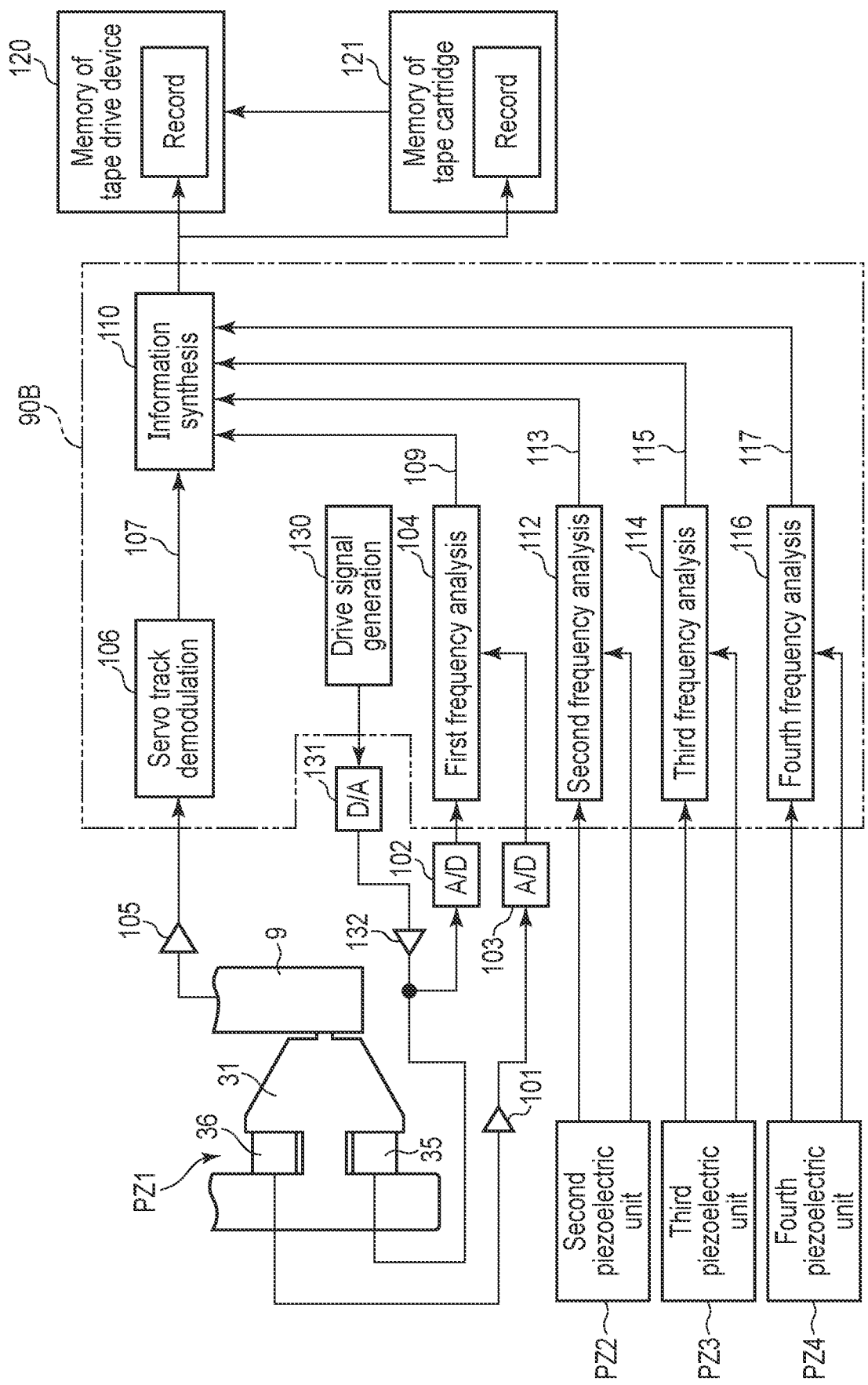
FIG. 10 is a block diagram showing a controller of the electrical circuit shown in FIG. 9.

[Second Embodiment] FIG. 9 to FIG. 10

A sensor function of a head drive device 10 of the second embodiment will be described below with reference to FIG. 9 and FIG. 10.

Similarly to the piezoelectric actuators PZ1, PZ2, PZ3, and PZ4 shown in FIG. 4, when each of the piezoelectric actuators includes a pair of piezoelectric elements, driving one of the pair of piezoelectric elements enables a piezoelectric output to be obtained from the other. Then, a waveform (frequency response) of the drive voltage of one of the piezoelectric elements is compared with a waveform (frequency response) of the piezoelectric output of the other piezoelectric element. It is possible to recognize the state of dirt adhesion on the head member 9 and the degree of deterioration of the tape, based on the difference in waveform.

FIG. 9 is a schematic diagram showing an electrical circuit for the sensor function of the head drive device 10 of the second embodiment. FIG. 10 is a block diagram showing an example of a specific configuration of a controller 90B. A mechanical structure of the head drive device 10 of the second embodiment is common to that in the first embodiment. For this reason, the components common to both of the mechanical structures will be denoted by common reference numerals and their descriptions will be omitted.

As shown in FIG. 9, a drive voltage is input to a piezoelectric element 35 of the first piezoelectric unit PZ1 and a piezoelectric element 37 of the second piezoelectric unit PZ2. In addition, a drive voltage is input to a piezoelectric element 65 of the third piezoelectric unit PZ3 and a piezoelectric element 67 of the fourth piezoelectric unit PZ4. A voltage output is obtained from the piezoelectric element 36 of the first piezoelectric unit PZ1 and the piezoelectric element 38 of the second piezoelectric unit PZ2. In addition, a voltage output is obtained from the piezoelectric element 66 of the third piezoelectric unit PZ3 and the piezoelectric element 68 of the fourth piezoelectric unit PZ4.

In the second embodiment, these voltage inputs and voltage outputs are processed by the controller 90B shown in FIG. 10. Furthermore, a position of dirt (i.e., a position in the tape width direction) is detected. With respect to the controller 90B shown in FIG. 10, the parts common to the controller 90A of the first embodiment shown in FIG. 8 will be denoted by common referential numerals and their descriptions will be omitted.

In the controller 90B shown in FIG. 10, a drive voltage generated by a drive signal generation circuit 130 is supplied to the piezoelectric element 35 through a digital-to-analog converter 131 and a drive signal amplifier 132. The piezoelectric element 35 is driven by this drive voltage. The piezoelectric element 36 generates a piezoelectric output by the piezoelectric effect. The piezoelectric output is transmitted to a first frequency analysis circuit 104 via a piezoelectric amplifier 101 and an analog-to-digital converter 103.

The first frequency analysis circuit 104 obtains, from the drive input and the voltage output, frequency analysis data that is a function of the frictional resistance between the tape 7 and the head member 9 for each position. Similarly to the first frequency analysis circuit 104, second, third, and fourth frequency analysis circuits 112, 114, and 116 also obtain frequency analysis data for each position. The frequency analysis data are the functions of the frictional resistance between the tape 7 and the head member 9. The frequency analysis data are input to the information synthesis circuit 110, similarly to the first embodiment, to generate an information map.

[Third Embodiment] FIG. 11 to FIG. 14

A sensor function of a head drive device 10 of the third embodiment will be described below with reference to FIG. 11 and FIG. 14.

During a normal operation of the head drive device 10, accessing a tape such as magnetic writing and reading is performed by a head member. In the third embodiment, dirt on the head member is detected based on drive signals supplied to piezoelectric units PZ1, PZ2, PZ3, and PZ4 and a waveform of a signal obtained from an additional circuit, during the normal operation of the head drive device 10.

Even when the piezoelectric element is driven by the drive voltage, the piezoelectric output is generated by the piezoelectric effect caused by the distortion of the piezoelectric element. Therefore, signal processing is performed based on the drive signal supplied to the piezoelectric element and the piezoelectric output indirectly measured by an external additional circuit. In other words, in the third embodiment, the piezoelectric element functions as a sensor during the normal operation of the head drive device 10.

To detect the piezoelectric output simultaneously with the drive signal, for example, a partial voltage of the signal detection circuit connected in series with the piezoelectric element is detected. Alternatively, an output of a bridge circuit composed of the piezoelectric element and the signal detection circuit is detected. The stress generated in the piezoelectric element is affected by the state of the tape. The sensor output is obtained from the piezoelectric element by processing a voltage containing the piezoelectric component generated by the stress on the piezoelectric element, and the drive voltage supplied to the piezoelectric element.

For example, as shown in FIG. 11, a drive signal voltage Vi of a drive signal 140 and a partial voltage Vo of a signal detection circuit 141 and a piezoelectric element PZ are measured. The sensor output is obtained by processing the measured voltages Vi and Vo by the signal detection circuit 141.

As shown in FIG. 12, the drive signal voltage Vi, and the output Vo of the bridge circuit composed of three signal detection circuits 142, 143, and 144 and the piezoelectric element PZ are measured. Then, the sensor output is obtained by processing the voltage Vi and the output Vo. An impedance ratio of the signal detection circuits 142 and 143 is set to be equal to that of the piezoelectric element PZ and the signal detection circuit 144.

Figure 13:
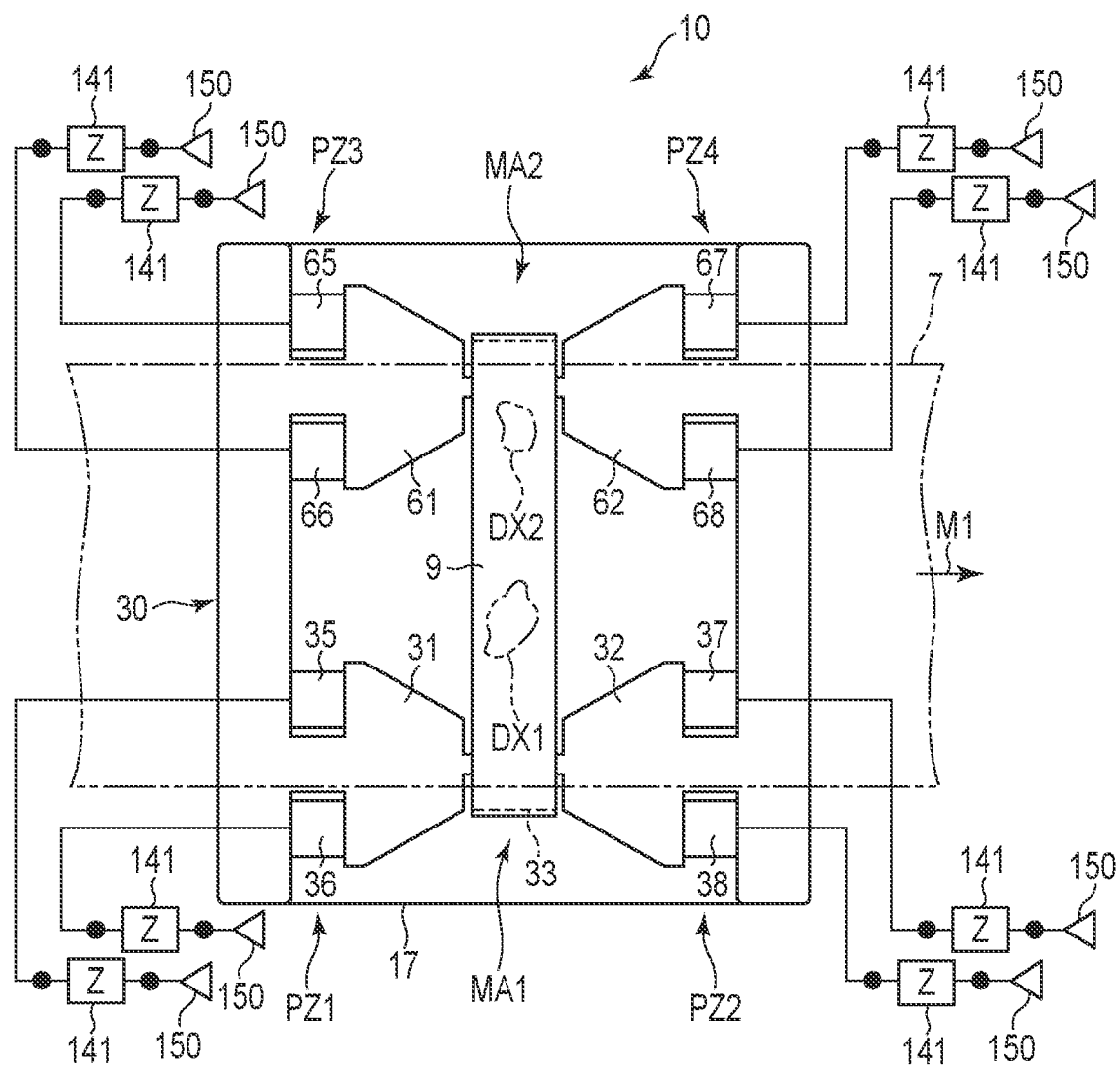
FIG. 13 is a view schematically showing an electrical circuit for a sensor function of a head drive device according to a third embodiment.

In third embodiment, as shown in FIG. 13, signal detection circuits 141 and drive signal amplifiers 150 are provided for each of the piezoelectric units PZ1, PZ2, PZ3, and PZ4. The signal detection circuits 141 detect piezoelectric signals in addition to drive signals. FIG. 14 is a block diagram showing an example of the controller 90C of the third embodiment. A mechanical structure of the head drive device 10 of the third embodiment is common to that in the first embodiment. For this reason, the components common to both of the mechanical structures will be denoted by common reference numerals and their descriptions will be omitted.

Figure 14:
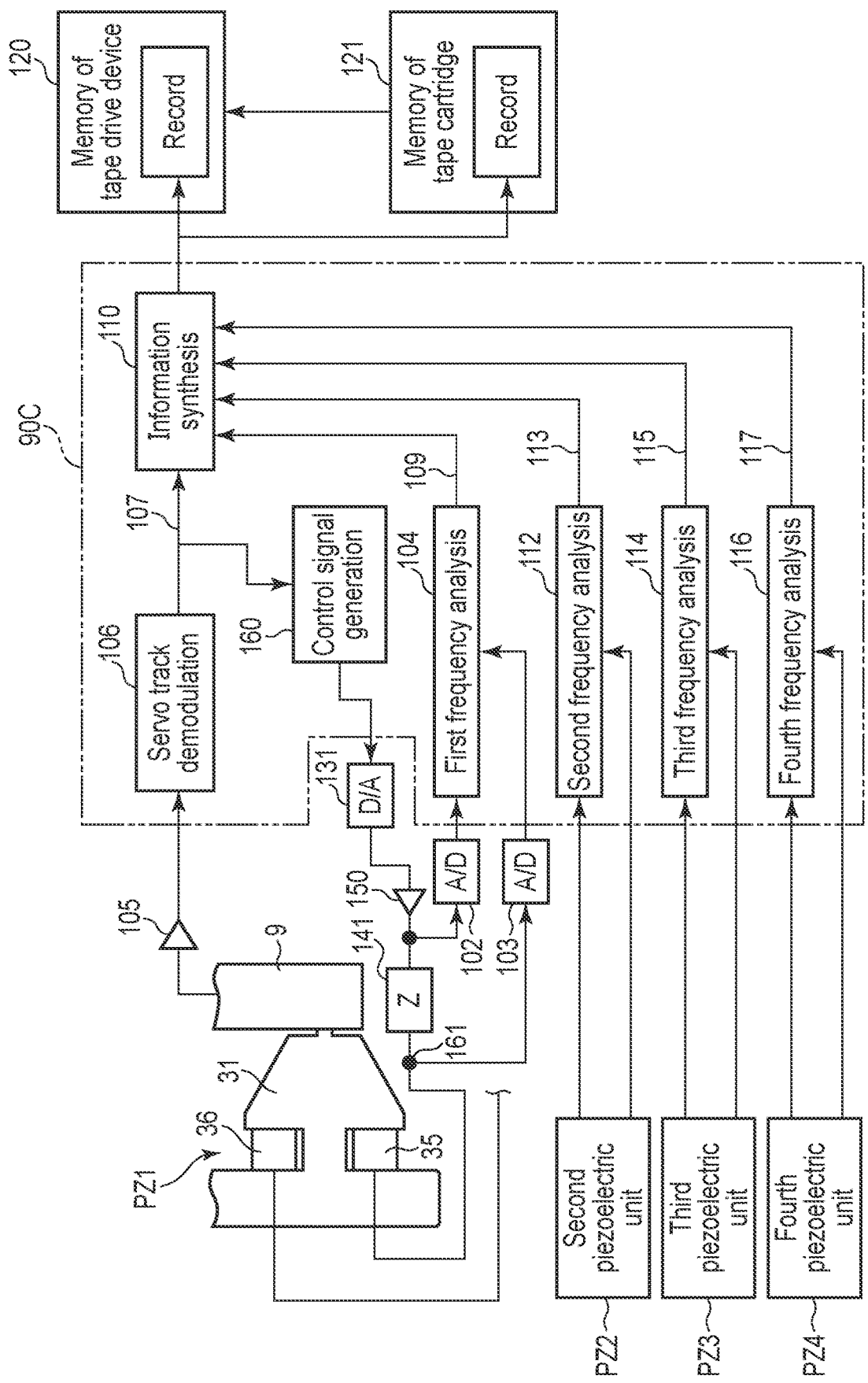
FIG. 14 is a block diagram showing a controller of the electrical circuit shown in FIG. 13.

In the third embodiment, the drive voltage and the piezoelectric output are processed by a controller 90C shown in FIG. 14. With respect to the controller 90C shown in FIG. 14, the parts common to the controller 90A of the first embodiment shown in FIG. 8 will be denoted by common referential numerals and their descriptions will be omitted.

In the controller 90C shown in FIG. 14, a control signal for precision tracking is generated by a control signal generation circuit 160. This control signal is supplied to the piezoelectric element 35 through the digital-to-analog converter 131, the drive signal amplifier 150, and the signal detection circuit 141. The stress is generated in the piezoelectric element 35 by this additional circuit. A voltage (piezoelectric output) is generated on the piezoelectric element 35 by the piezoelectric effect caused by this stress. This piezoelectric output is input to a first frequency analysis circuit 104 via a voltage measurement point 161 and an analog-to-digital converter 103.

The first frequency analysis circuit 104 obtains, from the drive voltage and the piezoelectric output, the frequency analysis data for each position. The frequency analysis data is a function of the frictional resistance between the tape 7 and the head member 9. Similarly to the first frequency analysis circuit 104, second, third, and fourth frequency analysis circuits 112, 114, and 116 also obtain frequency analysis data for each position. The frequency analysis data is a function of the frictional resistance between the tape 7 and the head member 9. The frequency analysis data are input to the information synthesis circuit 110, similarly to the first embodiment, to generate an information map.

Other Embodiments

The actuator assemblies MA1 and MA2 are vibrated by the voice coil motors 15 and 16 shown in FIG. 3. The health of the control system of the head drive device 10 is inspected based on voltage signals (piezoelectric outputs) output by the vibrated piezoelectric units PZ1, PZ2, PZ3, and PZ4. In addition, the state of physical deterioration of the tape 7 (for example, elongation of the tape 7) can be detected by measuring the contact pressure P1 between the tape 7 and the head member 9 shown in FIG. 6 with the piezoelectric units PZ1, PZ2, PZ3, and PZ4.

As described above, an example of a method of detecting the state of the head unit of the tape drive device 1 includes the following constituent features:
  (1) supporting a head member 9 by a suspension member 31, 32, 61, or 62 in which a piezoelectric element is arranged;
  (2) moving a tape 7 against the head member 9 in a longitudinal direction of the tape 7;
  (3) applying a load in proportion to a magnitude of a frictional force generated on a contact surface 9c between the tape 7 and the head member 9 to the suspension member 31, 32, 61, or 62;
  (4) generating a piezoelectric output in the piezoelectric element in a state in which the load is applied to the suspension member 31, 32, 61, or 62; and
  (5) determining a state of the contact surface 9c between the tape 7 and the head member 9, based on variation of the piezoelectric output.

It goes without saying that the present invention can be carried out by variously modifying the specific aspect of each of the elements constituting the head drive device. For example, the number of actuator assemblies may be one, or three or more. Alternatively, the tape drive device can also take various forms as needed.

Additional advantages and modifications will readily occur to those skilled in the art. Therefore, the invention in its broader aspects is not limited to the specific details and representative embodiments shown and described herein. Accordingly, various modifications may be made without departing from the 10 spirit or scope of the general inventive concept as defined by the appended claims and their equivalents.

What is claimed is:

1. A tape drive device using a tape as a recording medium, the tape drive device comprising:
  a head member having a contact surface that is in contact with the tape;
  a tape drive mechanism moving the tape against the head member in a longitudinal direction of the tape;
  a base member;

a suspension member arranged between the base member and the head member to support the head member;

a piezoelectric unit arranged in the suspension member and comprising a piezoelectric element that deforms the suspension member in a state in which a voltage is applied;

a drive voltage supply circuit supplying a drive voltage to the piezoelectric element; and a controller detecting a piezoelectric output generated at the piezoelectric element in a state in which the suspension member is deformed.

2. The tape drive device of claim 1, wherein
the controller detects dirt adhering to the contact surface of the head member, based on the piezoelectric output.

3. The tape drive device of claim 1, wherein
the controller detects elongation of the tape, based on the piezoelectric output.

4. The tape drive device of claim 1, including:
a head cleaning member cleaning the contact surface of the head member, wherein
when the controller detects dirt on the tape, the head cleaning member moves to the contact surface.

5. The tape drive device of claim 1, including:
a first actuator assembly and a second actuator assembly arranged to be spaced apart from each other in a width direction of the tape; and
piezoelectric elements arranged in the first actuator assembly and the second actuator assembly, respectively, wherein
the controller detects a position in the tape width direction of dirt adhering to the contact surface of the head member, based on a piezoelectric output of the piezoelectric element arranged in the first actuator assembly and a piezoelectric output of the piezoelectric element arranged in the second actuator assembly.

6. A method of detecting a state of a head unit of a tape drive device, the method comprising:

supporting a head member by a suspension member in which a piezoelectric element is arranged;

moving a tape against the head member in a longitudinal direction of the tape;

applying a load in proportion to a magnitude of a frictional force generated on a contact surface between the tape and the head member to the suspension member;

generating a piezoelectric output in the piezoelectric element in a state in which the load is applied to the suspension member; and determining a state of the contact surface between the tape and the head member, based on variation of the piezoelectric output.

7. The method of claim 6, wherein
a first actuator assembly and a second actuator assembly are arranged to be spaced apart from each other in a width direction of the tape, and
a position in the tape width direction of dirt adhering to the contact surface of the head member is detected based on a piezoelectric voltage generated in a piezoelectric element arranged in the first actuator assembly and a piezoelectric voltage generated in a piezoelectric element arranged in the second actuator assembly.

8. The method of claim 6, wherein
a pair of piezoelectric elements are arranged in the suspension member,
a drive voltage is applied to one of the pair of piezoelectric elements,
a piezoelectric voltage obtained from the other of the pair of piezoelectric element is detected, and
a state of the head member is determined based on a difference between a frequency response of the drive voltage and a frequency response of the piezoelectric voltage.

* * * * *